United States Patent
Chen et al.

(10) Patent No.: US 8,228,302 B2
(45) Date of Patent: Jul. 24, 2012

(54) DISPLAY APPARATUS AND DATA READ-OUT CONTROLLER THEREOF

(75) Inventors: Chung-Chun Chen, Hsinchu (TW); Cheng-Chiu Pai, Hsinchu (TW); Yu-Hsuan Li, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 974 days.

(21) Appl. No.: 12/235,991

(22) Filed: Sep. 23, 2008

(65) Prior Publication Data

US 2010/0020024 A1   Jan. 28, 2010

(30) Foreign Application Priority Data

Jul. 22, 2008   (TW) ................................ 97127779 A (51) Int. Cl.
  *G06F 3/041* (2006.01)
(52) U.S. Cl. ........................................................ 345/173
(58) Field of Classification Search ........... 345/173–183
  See application file for complete search history.

(56) References Cited

U.S. PATENT DOCUMENTS

2007/0126689 A1   6/2007 Ishii et al.
2008/0029688 A1*  2/2008 Yagi et al. ..................... 345/173

* cited by examiner

*Primary Examiner* — Kevin M Nguyen
*Assistant Examiner* — Sepideh Ghafari
(74) *Attorney, Agent, or Firm* — Thomas, Kayden, Horstemeyer & Risley, LLP (57) ABSTRACT

A display apparatus and a data read-out controller thereof are provided. The display apparatus comprises a touch display module, a first data read-out controller, and a second data read-out controller. Each of the first and the second data read-out controllers comprises a first read-out switch, a second read-out switch, a first sampling unit, and a second sampling unit. According to the time division multiple output operated by the first sampling units, the first read-out switches, the second sampling units, and the second read-out switches of the first and the second data read-out controllers, the number of the output points and power loss can be reduced effectively.

22 Claims, 9 Drawing Sheets

DISPLAY APPARATUS AND DATA READ-OUT CONTROLLER THEREOF

This application claims the benefit of priority based on Taiwan Patent Application No. 097127779 filed on Jul. 22, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The invention relates to a display apparatus and a data read-out controller thereof. And more particularly, the invention relates to a display apparatus with a touch screen and a data read-out controller configured to read out the sensing signals of the touch screen.

2. Descriptions of the Related Art

Over recent years, flat panel displays have gradually replaced conventional cathode ray tube (CRT) displays. There are currently following categories of flat panel displays: organic light-emitting diode (OLED) displays, plasma display panels (PDPs), liquid crystal displays (LCDs), and field emission displays (FEDs). Among these flat panel displays, LCDs have many advantages, such as a small volume, a flat square panel, high definition and stable picture quality, as well as low power consumption and a lack of radiation. As a result, LCDs have been widely used in many electronic products such as mobile phones, screens, digital televisions and notebook computers.

In addition, touch control functions have been added into certain LCDs for more convenient operation. Generally, such an LCD is known as a touch LCD.

In the touch LCD, the touch display module outputs a plurality of sensing signals to the data read-out controller in response to the user's touch, and then the data read-out controller outputs data signals to a touch control chip individually. More specifically, each pixel on the display panel of the touch LCD is configured to output a sensing signal to the data read-out controller depending on the user's touch, and the data read-out controller outputs a data signal to the touch control chip in response to each of the sensing signals.

Figure 1:
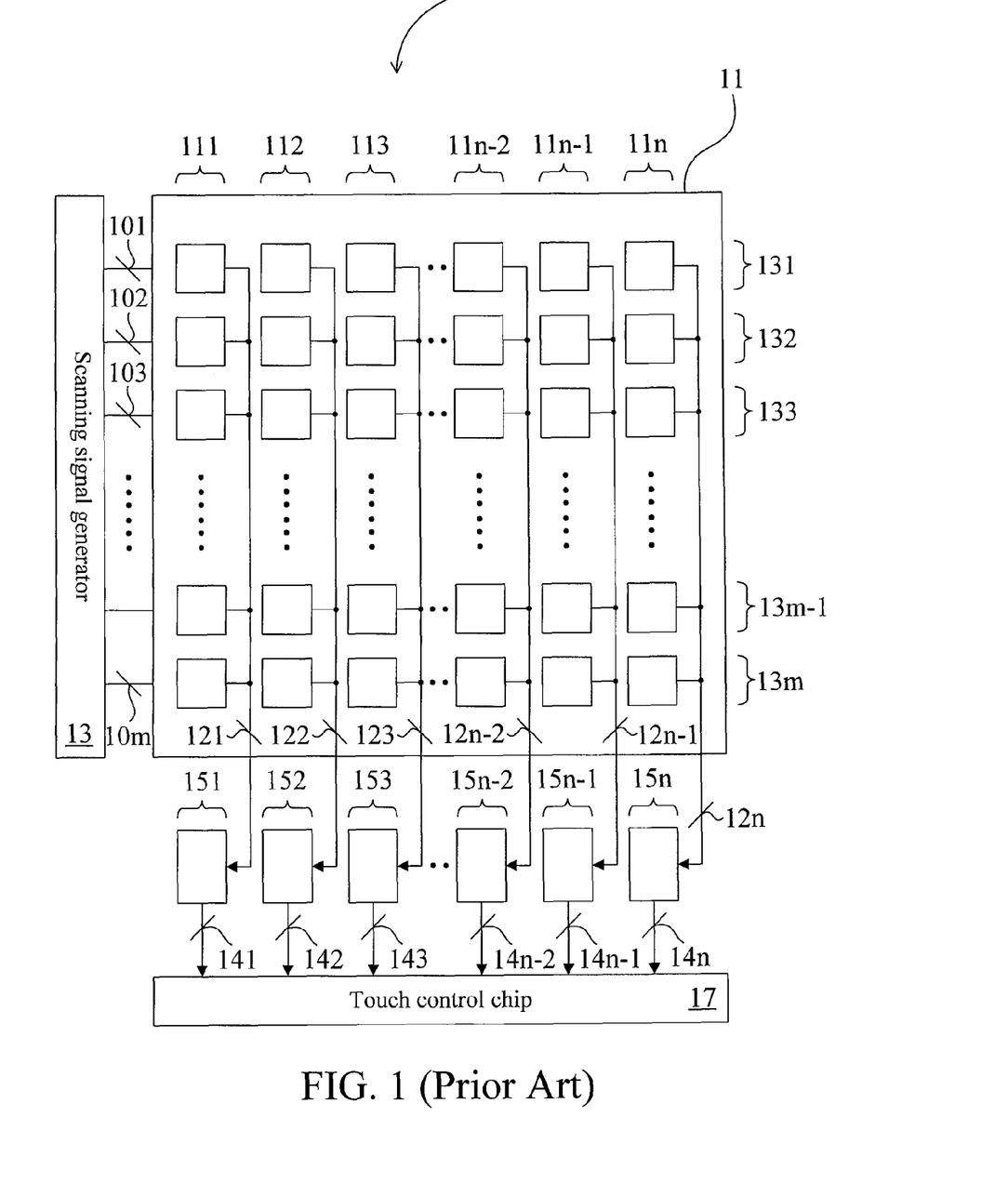
FIG. 1 is a schematic drawing of a LCD of the prior art.

As shown in FIG. 1, a conventional touch LCD 1 comprises a display panel 11, a scanning signal generator 13, a plurality of data read-out controllers 151, 152, 153, ..., 15n and a touch control chip 17. The display panel 11 comprises m rows (131, 132, 133, ..., 13m)×n columns (111, 112, 113, ..., 11n) of pixels, i.e., m×n pixels. The pixels in each of the columns are simultaneously and electrically connected to a single data read-out controller. For example, the pixels in the first column 111 of the display panel 11 are simultaneously and electrically connected to the data read-out controller 151, the pixels in the second column 112 of the display panel 11 are simultaneously and electrically connected to the data read-out controller 152, etc. Finally, the pixels in the $n^{th}$ column 11n of the display panel 11 are simultaneously and electrically connected to the data read-out controller 15n. These data read-out controllers 151, 152, 153, ..., 15n are electrically connected to the touch control chip 17 individually. The sensing signals 121, 122, 123, ..., 12n of the pixels in each column of the display panel 11 will be outputted to the data read-out controllers 151, 152, 153, ..., 15n in sequence according to the timing sequence of a plurality of scanning signals 101, 102, 103, ..., 10m generated by the scanning signal generator 13. When the sensing signals 121, 122, 123, ..., 12n are read by the data read-out controllers 151, 152, 153, ..., 15n, respectively, data 141, 142, 143, ..., 14n will be generated and outputted to the touch control chip 17 individually for subsequent signal processing.

More specifically, each of the data read-out controllers 151, 152, 153, ..., 15n is electrically connected to the touch control chip 17 through an output point. When the display panel 11 of the touch LCD 1 comprises 50 rows×100 columns of pixels, 100 data read-out controllers will be needed to read the sensing signals and also the 100 output points that will be needed to output data to the touch control chip 17. If the display panel 11 of the touch LCD 1 comprises 500 rows× 1000 columns of pixels, 1000 data read-out controllers will be needed to read the sensing signals and also the 1000 output points that will be needed to output data to the touch control chip 17. This will increase the manufacturing cost, circuit complexity and power consumption of the touch LCD 1.

To reduce the manufacturing cost, circuit complexity and power consumption, manufacturers have chosen to manufacture touch LCDs that can read out the sensing signals and output data by using time division multiplexing to reduce the number of data read-out controllers and that of output points. However, if time division multiplexing is directly used to read out the sensing signals and output the data, the sensing signals read out by the individual data read-out controllers will have different charging times. This will lead to an error in reading out the sensing signals and make the data outputted to the touch control chip incorrect. As a result, the LCD will falsely depict the user's input.

In summary, although time division multiplexing may decrease manufacturing costs, circuit complexity and power consumption by remarkably reducing the number of data read-out controllers and output points, it is difficult to correctly operate. In view of this, it is important to reduce the number of data read-out controllers and output points while still decreasing the error of sensing signals.

SUMMARY OF THE INVENTION

One objective of the invention is to provide a data read-out controller adapted for use in a display apparatus. By using sampling units and read-out switches in the data read-out controller, there will be sufficient sampling charging time.

To achieve the aforementioned objective, the invention provides a data read-out controller, which comprises a first read-out switch, a second read-out switch, a first sampling unit and a second sampling unit. The first sampling unit is configured to receive a sensing signal and generate a first data in response to the sensing signal. The second sampling unit is configured to receive the sensing signal and generate a second data in response to the sensing signal. When the second sampling unit generates the second data in response to the sensing signal, the first read-out switch receives and outputs the first data. Likewise, when the first sampling unit generates the first data in response to the sensing signal, the second read-out switch receives and outputs the second data. By using the data read-out controller of the invention, there will be sufficient sampling charging time.

Another objective of the invention is to provide a display apparatus with a touch display module. Through the display apparatus, a plurality of sensing signals from the touch display module can be outputted via a single point, and it can also reduce the number of points of output data signals significantly. Thus, the cost and power consumption are reduced.

To achieve the aforementioned objective, the invention provides a display apparatus, which comprises a touch display module, a first data read-out controller and a second data read-out controller. The touch display module is configured to output a plurality of sensing signals, including a first sensing signal and a second sensing signal. The first data read-out controller, which is electrically connected to the touch display module, is configured to receive the first sensing signal and generate the first data and the second data in response to the first sensing signal. The second data read-out controller, which is also electrically connected to the touch display module, is configured to receive the second sensing signal and generate a third data and a fourth data in response to the second sensing signal.

According to the embodiments of the invention, when the first data read-out controller and the second data read-out controller generate the second data and the fourth data simultaneously in response to the first sensing signal and the second sensing signal respectively, the first data read-out controller outputs the first data in response to a first read-out signal, while the second data read-out controller outputs the third data in response to a third read-out signal. When the first data read-out controller and the second data read-out controller generate the first data and the third data simultaneously in response to the first sensing signal and the second sensing signal respectively, the first data read-out controller outputs the second data in response to a second read-out signal, while the second data read-out controller outputs the fourth data in response to a fourth read-out signal.

By using the display apparatus and the data read-out controller described above, a plurality of sensing signals from the touch display module can be outputted via a single point, which reduces the number of points of output data signals significantly. Thus, the cost and power consumption are reduced, while decreasing errors in the sensing signals.

The detailed technology and preferred embodiments implemented for the subject invention are described in the following paragraphs accompanying the appended drawings for people skilled in the field to well appreciate the features of the claimed invention.

DESCRIPTION OF THE PREFERRED EMBODIMENT

In the following description, embodiments will be described to explain the invention, which provides a display apparatus and a data read-out controller thereof. By using a sampling unit and a read-out switch, the sensing signals which the data read-out controller read out will have equal charging times. Meanwhile, a plurality of data signals generated by the data read-out controller can be outputted via a single point, and it can reduce the number of points significantly. Thus, the cost and power consumption are reduced.

However, the embodiments of the invention are not limited to any particular environment, application or implementation. Therefore, the descriptions of the embodiments that follow are for purposes of illustration and not limitation. It is understood that elements indirectly related to the present invention are omitted and are not shown in the following embodiments and drawings. For ease of understanding, the dimensional relationships among the individual elements in the attached drawings are not depicted on the actual scale.

Figure 2:
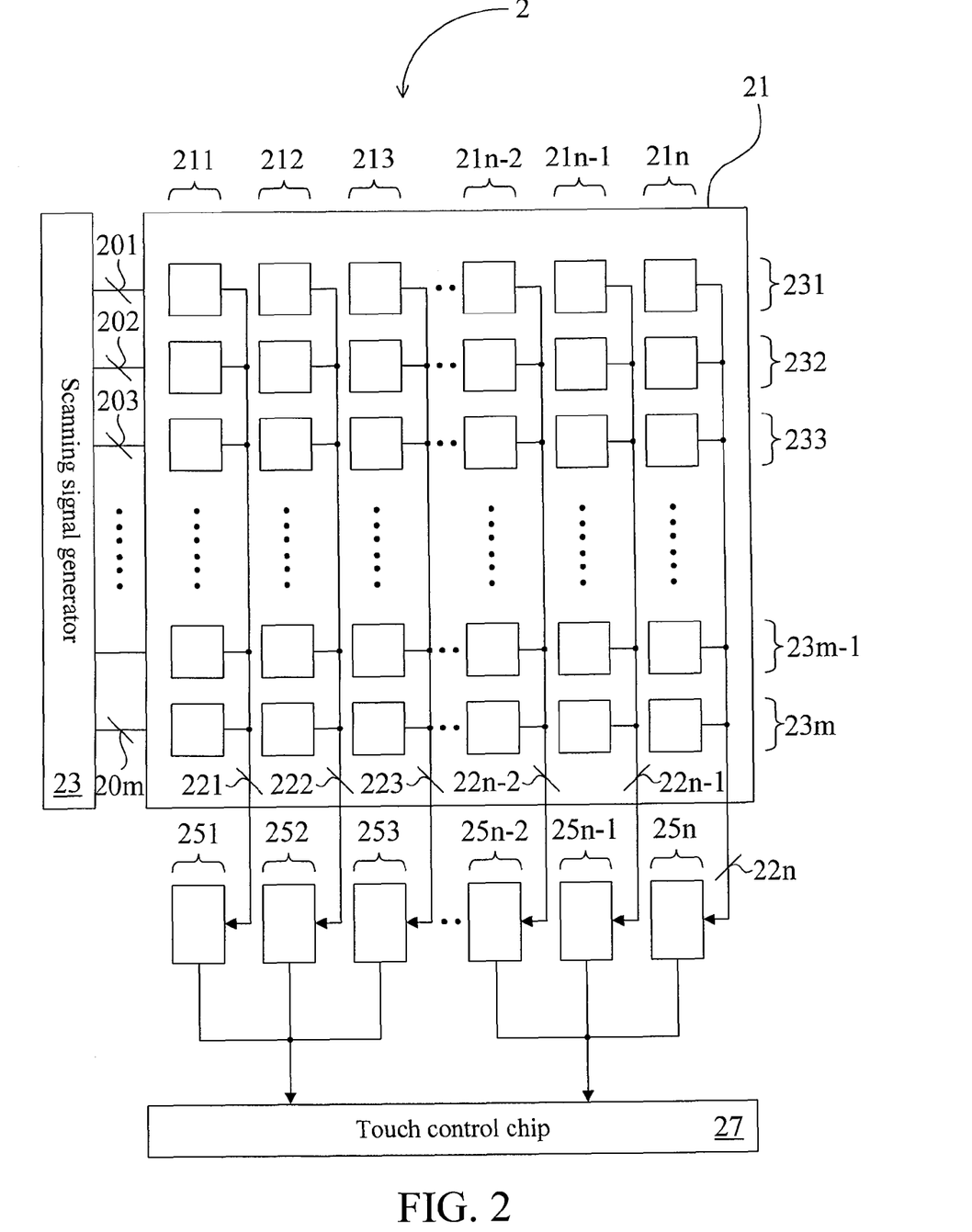
FIG. 2 is a schematic drawing of the preferred embodiment of the invention.

FIG. 2 depicts a display apparatus according to the preferred embodiment of the invention. The display apparatus 2 comprises a touch display module 21, a scanning signal generator 23, a plurality of data read-out controllers 251, 252, 253, . . . , 25$n$ and a touch control chip 27. The touch display module 21 comprises m rows (231, 232, 233, . . . , 23$m$)×n columns (211, 212, 213, . . . , 21$n$) of pixels, i.e., m×n pixels. The pixels in each of the columns are simultaneously and electrically connected to a single data read-out controller. For example, the pixels in the first column 211 of the touch display module 21 are simultaneously and electrically connected to the data read-out controller 251, the pixels in the second column 212 of the touch display module 21 are simultaneously and electrically connected to the data read-out controller 252, and the pixels in the n$^{th}$ column 21$n$ of the touch display module 21 are simultaneously and electrically connected to the data read-out controller 25$n$. These data read-out controllers 251, 252, 253, . . . , 25$n$ are electrically connected to the touch control chip 27 in groups of three. The sensing signals 221, 222, 223, . . . , 22$n$ of the pixels in each column of the touch display module 21 will be outputted to the data read-out controllers 251, 252, 253, . . . , 25$n$ respectively in sequence according to the timing sequence of a plurality of scanning signals 201, 202, 203, . . . , 20$m$ generated by the scanning signal generator 23. When the sensing signals 221, 222, 223, . . . , 22$n$ are read out by the data read-out controllers 251, 252, 253, . . . , 25$n$ respectively, the data will be generated and outputted to the touch control chip 27 respectively in a time division multiplexing manner for subsequent signal processing.

In the preferred embodiment, the data read-out controllers 251, 252, 253, . . . , 25$n$ are electrically connected to the touch control chip 27 in such a manner that each group of three is connected via a single output point. For example, the data read-out controllers 251, 252, 253 are electrically connected to the touch control chip 27 via a single output point, while the data read-out controllers 25$n$-2, 252$n$-1, 25$n$ are also electrically connected to the touch control chip 27 via a single output point. In this way, every three data read-out controllers can share a single output point to output data to the touch control chip 27 in a time division multiplexing manner.

Even though every three data read-out controllers are electrically connected to the touch control chip 27 via a single output point in the display apparatus 2 depicted in FIG. 2, the invention is not limited by the number of data read-out controllers connected to a single output point. In other words, instead of being limited to the connection of only three data read-out controllers via a single output point, those of ordinary skill in the art may have four or more data read-out controllers electrically connected via a single output point to the touch control chip 27 upon reviewing the above description, and thus, will not be further described again.

Figure 3:
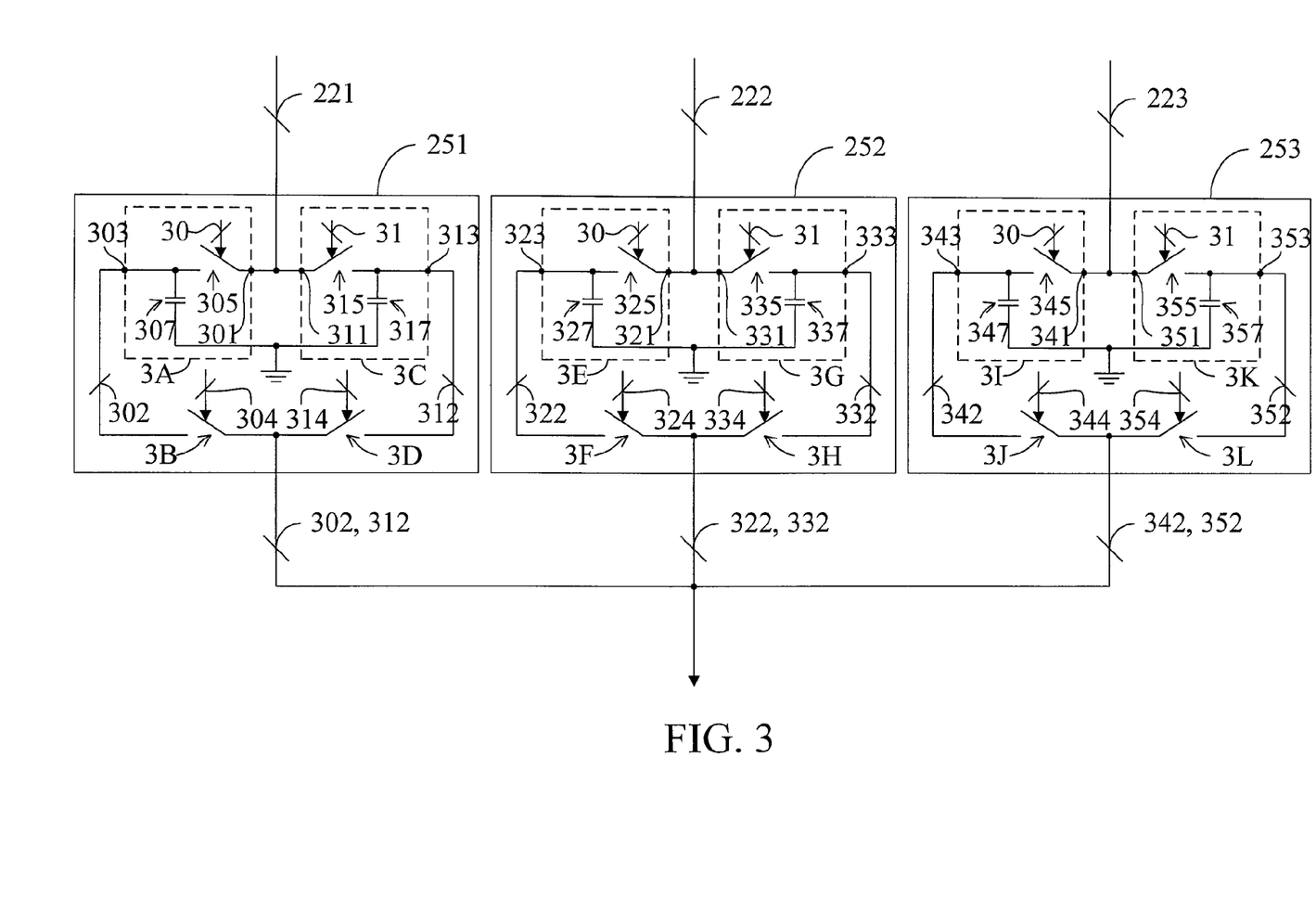
FIG. 3 is a schematic circuit diagram of the preferred embodiment of a data read-out controller.

Hereinafter, the method of the data read-out controllers reading the sensing signals in the preferred embodiment of the display apparatus of the invention will be described with reference to the different examples thereof. FIG. 3 depicts a schematic circuit diagram of the data read-out controllers 251, 252, 253. For convenience of description, the first data read-out controller 251, the second data read-out controller 252 and the third data read-out controller 253 are referred to as the data read-out controllers 251, 252, 253 respectively. Likewise, the first sensing signal 221, the second sensing signal 222 and the third sensing signal 223 are referred to as the sensing signals 221, 222, 223 respectively. The first data read-out controller 251 comprises a first sampling unit 3A, a first read-out switch 3B, a second sampling unit 3C and a second read-out switch 3D. The second data read-out controller 252 comprises a third sampling unit 3E, a third read-out switch 3F, a fourth sampling unit 3G and a fourth read-out switch 3H. The third data read-out controller 253 comprises a fifth sampling unit 3I, a fifth read-out switch 3J, a sixth sampling unit 3K and a sixth read-out switch 3L.

The first sampling unit 3A of the first data read-out controller 251 has a first point 301, a second point 303, a first on-off switch 305 and a first capacitor 307. The first on-off switch 305 is electrically connected to the first point 301 and the second point 303. The first capacitor 307 has a first terminal and a second terminal (not shown), in which the first terminal is electrically connected to the second point 303. The second sampling unit 3C has a third point 311, a fourth point 313, a second on-off switch 315 and a second capacitor 317. The second on-off switch 315 is electrically connected to the third point 311 and the fourth point 313. The second capacitor 317 has a first terminal and a second terminal (not shown), in which the first terminal is electrically connected to the fourth point 313.

In the first data read-out controller 251, the on/off-switch of the first on-off switch 305 is controlled by the first sampling signal 30, the on/off-switch of the first read-out switch 3B is controlled by the first read-out signal 304, the on/off-switch of the second on-off switch 315 is controlled by the second sampling signal 31, and the on/off-switch of the second read-out switch 3D is controlled by the second read-out signal 314.

The third sampling unit 3E of the second data read-out controller 252 has a fifth point 321, a sixth point 323, a third on-off switch 325 and a third capacitor 327. The third on-off switch 325 is electrically connected to the fifth point 321 and the sixth point 323. The third capacitor 327 has a first terminal and a second terminal (not shown), in which the first terminal is electrically connected to the sixth point 323. The fourth sampling unit 3G has a seventh point 331, an eighth point 333, a fourth on-off switch 335 and a fourth capacitor 337. The fourth on-off switch 335 is electrically connected to the seventh point 331 and the eighth point 333. The fourth capacitor 337 has a first terminal and a second terminal (not shown), in which the first terminal is electrically connected to the eighth point 333.

In the second data read-out controller 252, the on/off-switch of the third on-off switch 325 is also controlled by the first sampling signal 30, the on/off-switch of the third read-out switch 3F is controlled by the third read-out signal 324, the on/off-switch of the fourth on-off switch 335 is also controlled by the second sampling signal 31, and the on/off-switch of the fourth read-out switch 3H is controlled by the fourth read-out signal 334.

The fifth sampling unit 3I of the third data read-out controller 253 has a ninth point 341, a tenth point 343, a fifth on-off switch 345 and a fifth capacitor 347. The fifth on-off switch 345 is electrically connected to the ninth point 341 and the tenth point 343. The fifth capacitor 347 has a first terminal and a second terminal (not shown), in which the first terminal is electrically connected to the tenth point 343. The sixth sampling unit 3K has an eleventh point 351, a twelfth point 353, a sixth on-off switch 355 and a sixth capacitor 357. The sixth on-off switch 355 is electrically connected to the eleventh point 351 and the twelfth point 353. The sixth capacitor 357 has a first terminal and a second terminal (not shown), in which the first terminal is electrically connected to the twelfth point 353.

In the third data read-out controller 253, the on/off-switch of the fifth on-off switch 345 is also controlled by the first sampling signal 30, the on/off-switch of the fifth read-out switch 3J is controlled by the fifth read-out signal 344, the on/off-switch of the sixth on-off switch 355 is also controlled by the second sampling signal 31, and the on/off-switch of the sixth read-out switch 3L is controlled by the sixth read-out signal 354.

Figure 4:
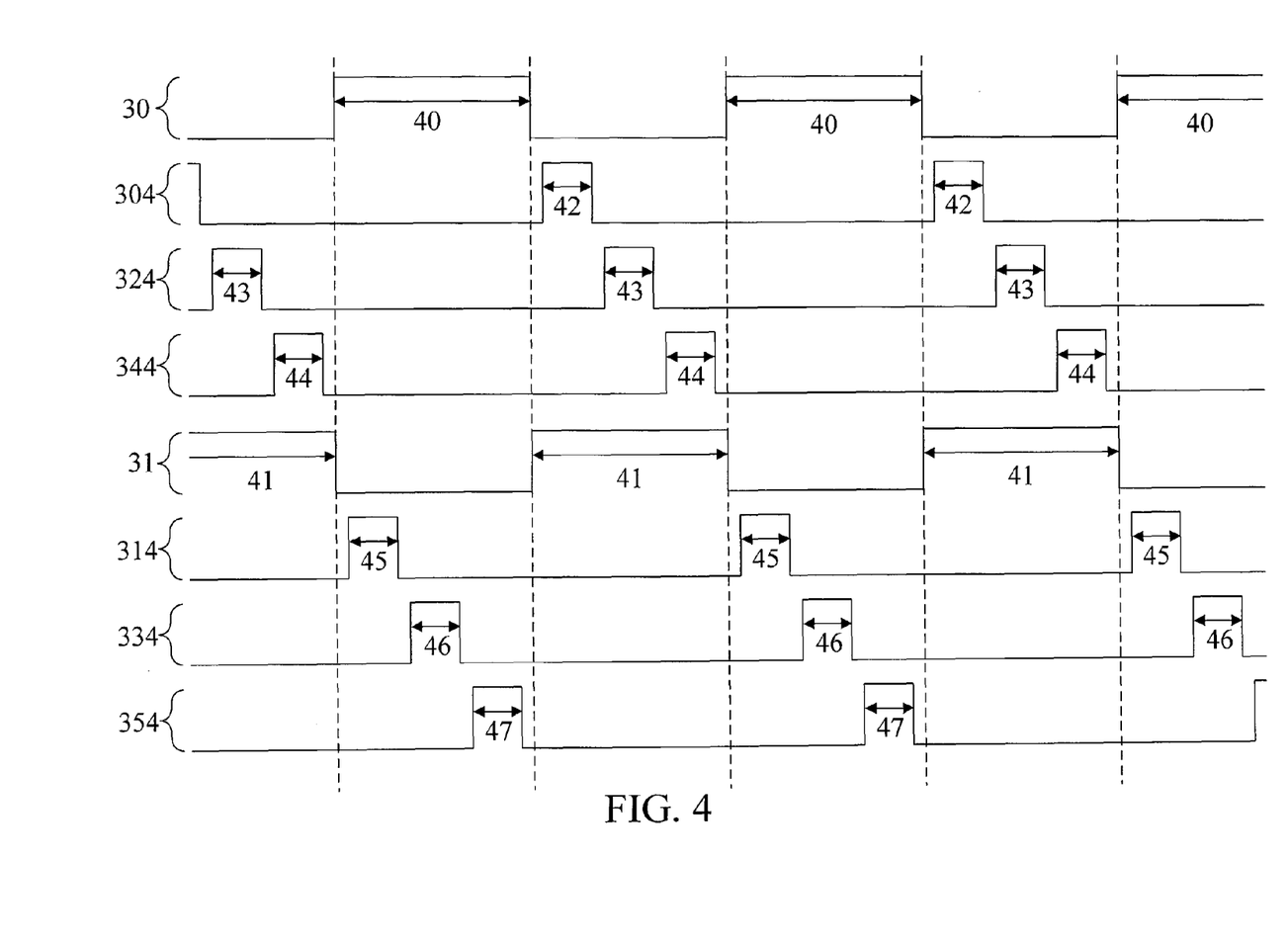
FIG. 4 is a waveform timing diagram of the preferred embodiment of the invention.

FIG. 4 depicts a waveform timing diagram of the first sampling signal 30, the second sampling signal 31, the first read-out signal 304, the second read-out signal 314, the third read-out signal 324, the fourth read-out signal 334, the fifth read-out signal 344 and the sixth read-out signal 354. When the first sampling signal 30 turns on the first on-off switch 305 of the first sampling unit 3A, the third on-off switch 325 of the third sampling unit 3E and the fifth on-off switch 345 of the fifth sampling unit 3I simultaneously (i.e., during the waveform interval 40), the first capacitor 307 is charged by the first sensing signal 221 to generate a first data 302, the third capacitor 327 is charged by the second sensing signal 222 to generate a third data 322, and the fifth capacitor 347 is charged by the third sensing signal 223 to generate a fifth data 342.

Then, when the second sampling signal 31 turns on the second on-off switch 315 of the second sampling unit 3C, the fourth on-off switch 335 of the fourth sampling unit 3G and the sixth on-off switch 355 of the sixth sampling unit 3K simultaneously (i.e., during the waveform interval 41), the second capacitor 317 is charged by the first sensing signal 221 to generate a second data 312, the fourth capacitor 337 is charged by the second sensing signal 222 to generate a fourth data 332, and the sixth capacitor 357 is charged by the third sensing signal 223 to generate a sixth data 352.

While the second capacitor 317, the fourth capacitor 337 and the sixth capacitor 357 are being charged, the first read-out switch 3B, the third read-out switch 3F and the fifth read-out switch 3J are turned on in sequence (i.e., during the waveform intervals 42, 43, 44) by the first read-out signal 304, the third read-out signal 324 and the fifth read-out signal 344, so that the first data 302, the third data 322 and the fifth data 342 are outputted in sequence to the touch control chip 27 via the second point 303, the sixth point 323 and the tenth point 343 respectively.

When the first sampling signal 30 turns on the first on-off switch 305 of the first sampling unit 3A, the third on-off switch 325 of the third sampling unit 3E and the fifth on-off switch 345 of the fifth sampling unit 3I simultaneously again to generate the first data 302, the third data 322 and the fifth data 342 respectively, the second read-out switch 3D, the fourth read-out switch 3H and the sixth read-out switch 3L are turned on in sequence (i.e., during the waveform intervals 45, 46, 47) by the second read-out signal 314, the fourth read-out signal 334 and the sixth read-out signal 354, so that the second data 302, the fourth data 332 and the sixth data 352 are outputted in sequence to the touch control chip 27 via the fourth point 313, the eighth point 333 and the twelfth point 353 respectively.

To summarize, after the first data 302, the third data 322 and the fifth data 342 with the same charging times are generated by the first data read-out controller 251, the second data read-out controller 252 and the third data read-out controller 253 use the first on-off switch 305, the third on-off switch 325 and the fifth on-off switch 345 respectively. Next, the second read-out switch 3D, the fourth read-out switch 3H and the sixth read-out switch 3L are turned on in sequence to output the second data 312, the fourth data 332 and the sixth data 352 to the touch control chip 27. Likewise, after the second data 312, the fourth data 332 and the sixth data 352 with the same charging times are generated by the first data read-out controller 251, the second data read-out controller 252 and the third data read-out controller 253 use the second on-off switch 315, the fourth on-off switch 335 and the sixth on-off switch 355 respectively. The first read-out switch 3B, the third read-out switch 3F and the fifth read-out switch 3J are turned on in sequence to output the first data 302, the third data 322 and the fifth data 342 to the touch control chip 27.

In this way, the first data read-out controller 251, the second data read-out controller 252 and the third data read-out controller 253 can output the data with the same charging times to the touch control chip in a time division multiplexing manner, which may decrease error in the sensing signals 221, 222, 223 so that the display apparatus 2 will not misjudge the user's input.

Figure 5:
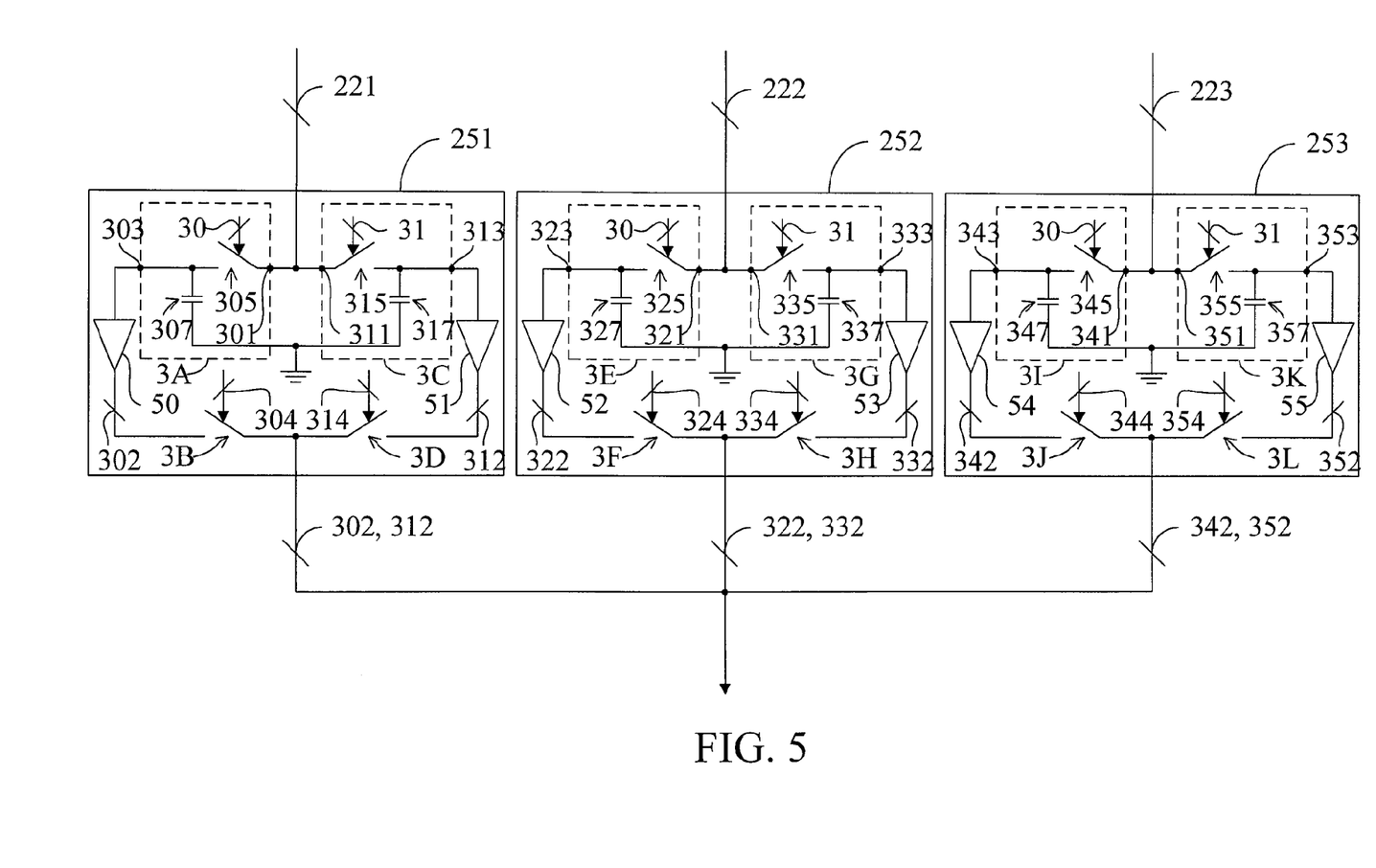
FIG. 5 is another schematic circuit diagram of the preferred embodiment of a data read-out controller of the invention.

FIG. 5 depicts another embodiment of the data read-out controllers 251, 252, 253. The first data read-out controller 251 further comprises a first unity gain buffer 50 and a second unity gain buffer 51 in addition to the comprising elements shown in FIG. 3; the second data read-out controller 252 further comprises a third unity gain buffer 52 and a fourth unity gain buffer 53 in addition to the comprising elements shown in FIG. 3. Likewise, the third data read-out controller 253 further comprises a fifth unity gain buffer 54 and a sixth unity gain buffer 55 in addition to the comprising elements shown in FIG. 3.

The first unity gain buffer 50 of the first data read-out controller 251 can maintain a voltage of the first data 302 effectively, while the second unity gain buffer 51 can maintain a voltage of the second data 312 effectively. By maintaining these voltages, the first data 302 and the second data 312 outputted to the touch control chip 27 will become more stable.

Similarly, the third unity gain buffer 52 of the second data read-out controller 252 can maintain a voltage of the third data 322 effectively, while the fourth unity gain buffer 53 can also maintain a voltage of the fourth data 332 effectively. As a result, the third data 322 and the fourth data 332 outputted to the touch control chip 27 will become more stable.

Likewise, the fifth unity gain buffer 54 of the third data read-out controller 253 can maintain a voltage of the fifth data 342 effectively, while the sixth unity gain buffer 55 can also maintain a voltage of the sixth data 352 effectively. Also, this will make the fifth data 342 and the sixth data 352 outputted to the touch control chip 27 more stable.

Other elements of the data read-out controllers 251, 252, 253 shown in FIG. 5 can also execute the operations and functions described with respect to the data read-out controllers 251, 252, 253 shown in FIG. 3. The methods in which the data read-out controllers 251, 252, 253 shown in FIG. 5 will execute these operations and functions will be readily appreciated by those of ordinary skill in the art based on description of the data read-out controllers 251, 252, 253 shown in FIG. 3, and thus will not be further described herein.

Figure 6A:
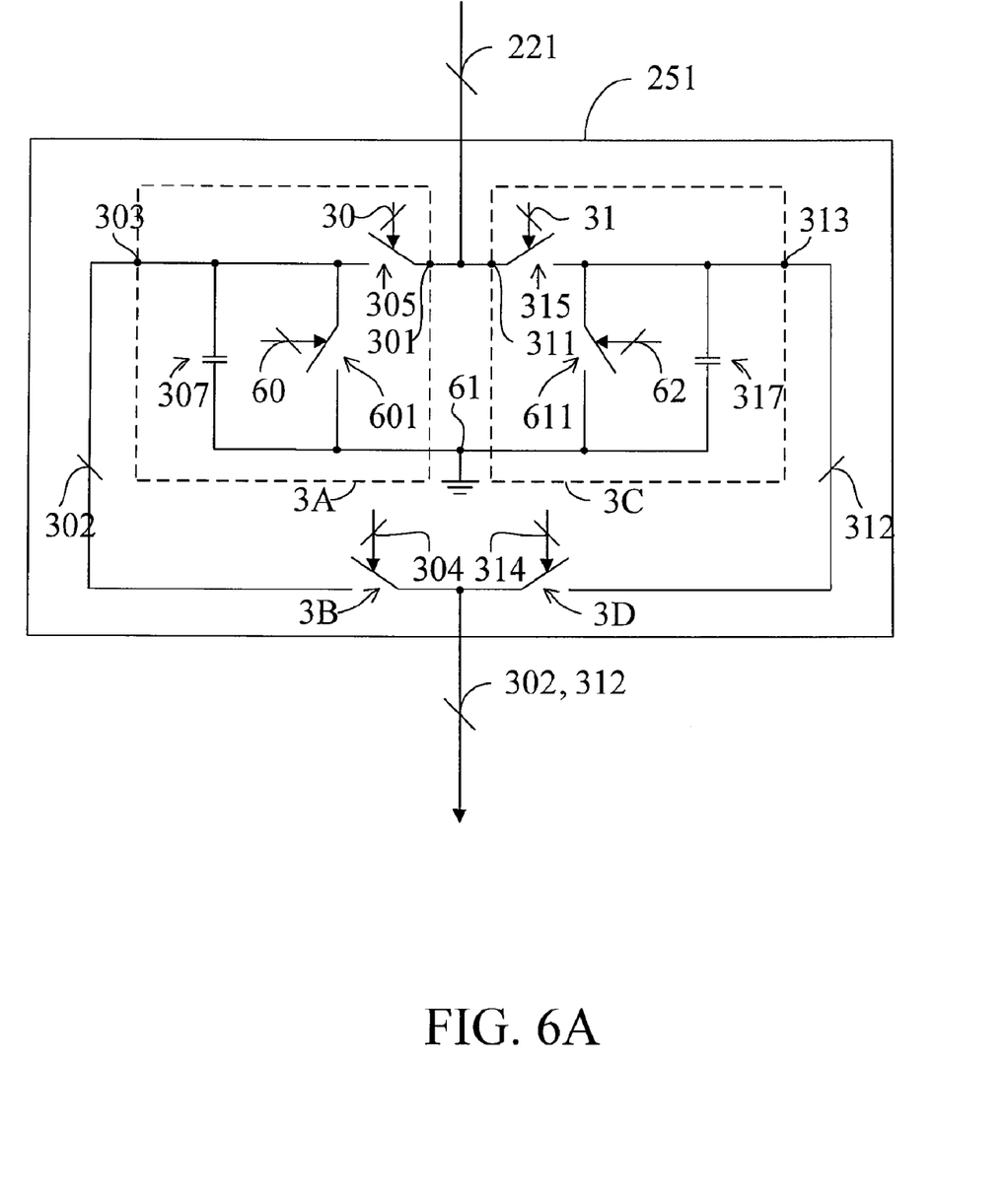
FIG. 6A is another schematic circuit diagram of the preferred embodiment of a data read-out controller of the invention.
Figure 6B:
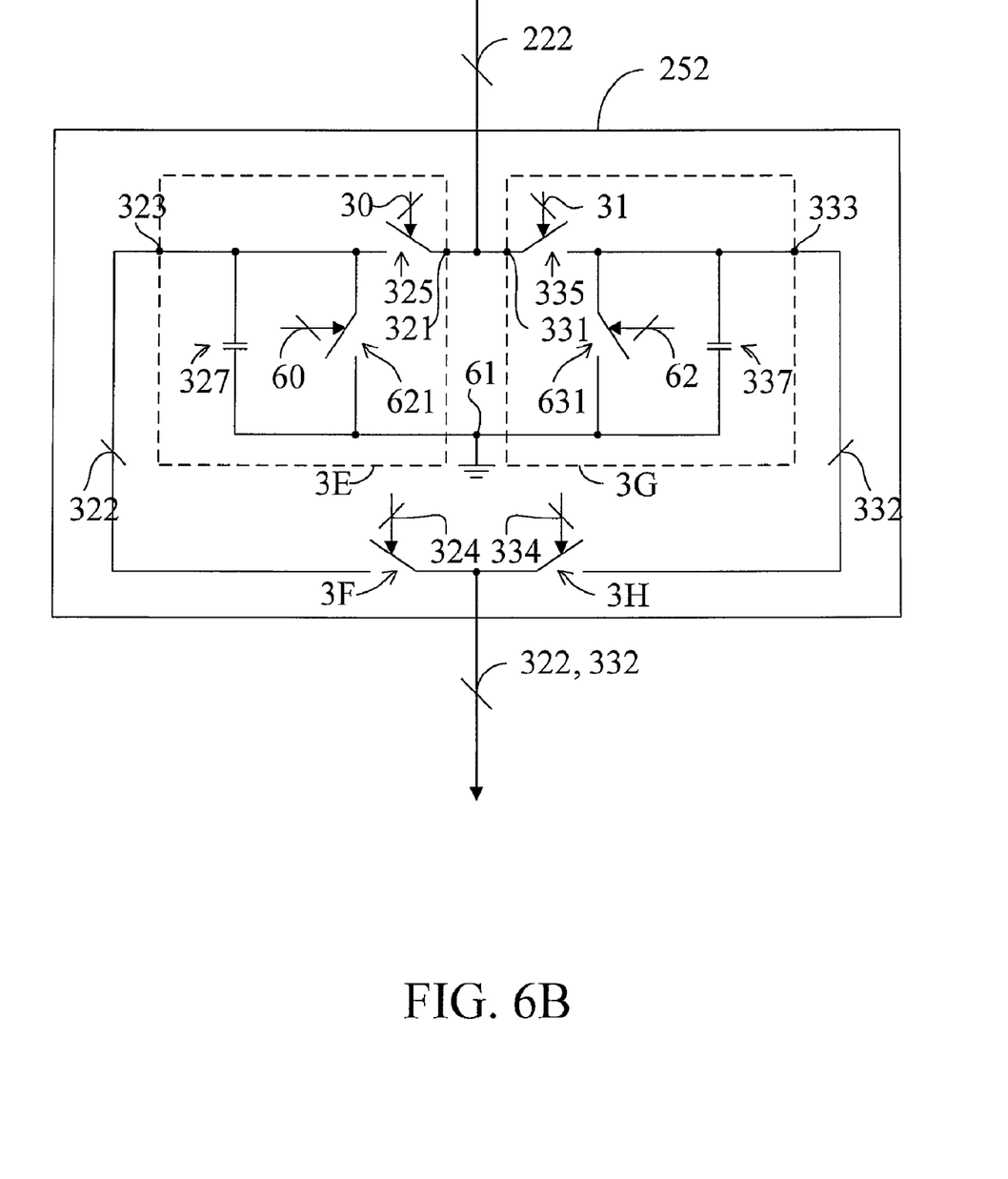
FIG. 6B is yet another schematic circuit diagram of the preferred embodiment of a data read-out controller of this invention.
Figure 6C:
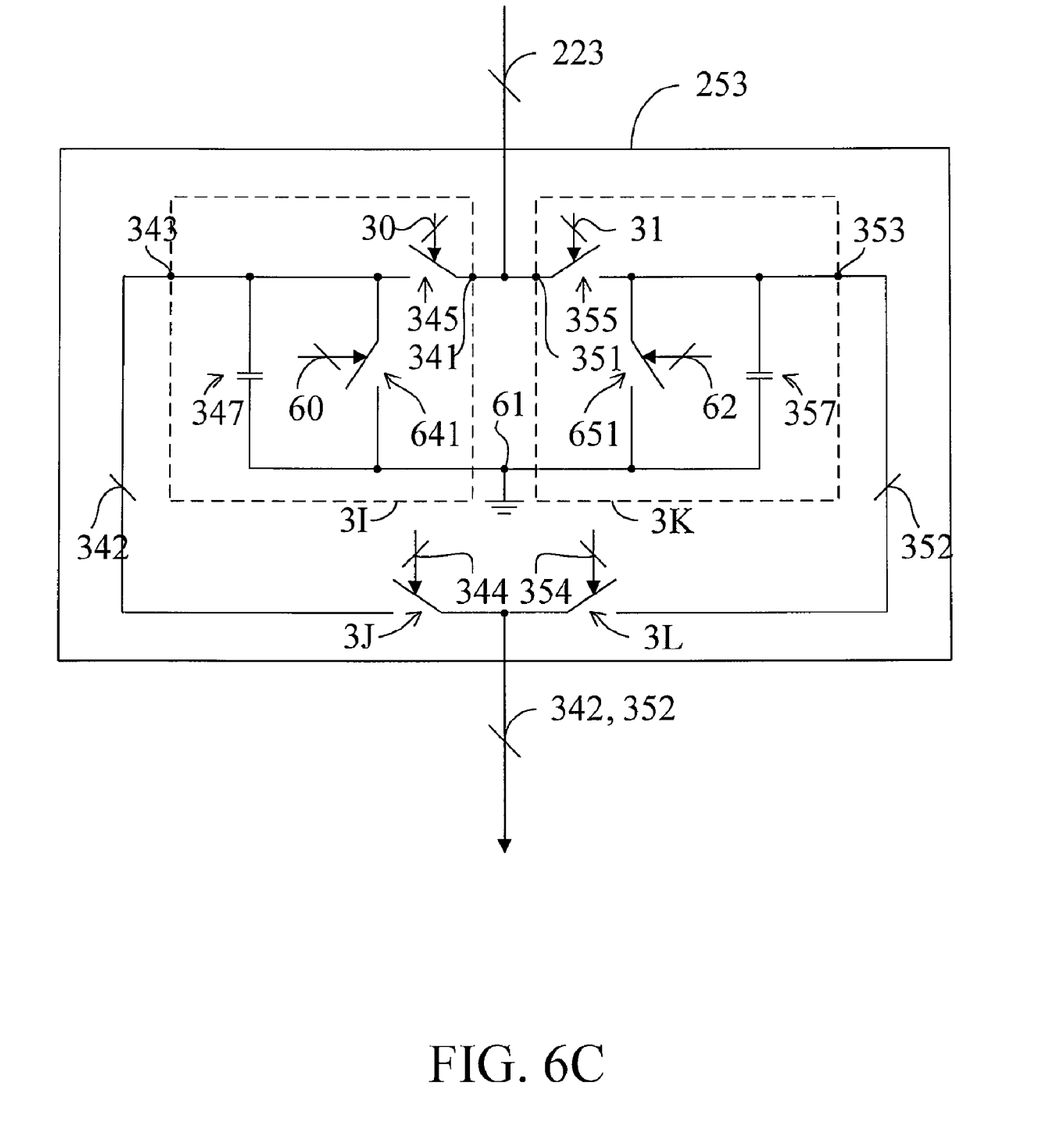
FIG. 6C is still another schematic circuit diagram of the preferred embodiment of a data read-out controller of the invention.

FIGS. 6A, 6B and 6C respectively depict other embodiments of the data read-out controllers 251, 252, 253. The first data read-out controller 251 shown in FIG. 6A further comprises a reset voltage point 61 in addition to the comprising elements shown in FIG. 3. The first sampling unit 3A of the first data read-out controller 251 further comprises a first reset switch 601, while the second sampling unit 3C further comprises a second reset switch 611. The second terminal (not shown) of the first capacitor 307 of the first sampling unit 3A is electrically connected to the reset voltage point 61. Similarly, the second terminal (not shown) of the second capacitor 317 of the second sampling unit 3C is also electrically connected to the reset voltage point 61. The on/off-switch of the first reset switch 601 is controlled by the first reset signal 60, while the on/off-switch of the second reset switch 611 is controlled by the second reset signal 62.

The second data read-out controller 252 shown in FIG. 6B further comprises a reset voltage point 61 in addition to the comprising elements shown in FIG. 3. The third sampling unit 3E of the second data read-out controller 252 further comprises a third reset switch 621, and the fourth sampling unit 3G further comprises a fourth reset switch 631. The second terminal (not shown) of the third capacitor 327 of the third sampling unit 3E is electrically connected to the reset voltage point 61, and similarly, a second terminal (not shown) of the fourth capacitor 337 of the fourth sampling unit 3G is also electrically connected to the reset voltage point 61. The on/off-switch of the third reset switch 621 is controlled by the first reset signal 60, while the on/off-switch of the fourth reset switch 631 is controlled by the second reset signal 62.

Likewise, the third data read-out controller 253 shown in FIG. 6C further comprises a reset voltage point 61 in addition to the comprising elements shown in FIG. 3. The fifth sampling unit 3I of the third data read-out controller 253 further comprises a fifth reset switch 641, and the sixth sampling unit 3K further comprises a sixth reset switch 651. The second terminal (not shown) of the fifth capacitor 347 of the fifth sampling unit 3I is electrically connected to the reset voltage point 61 Similarly, the second terminal (not shown) of the sixth capacitor 357 of the sixth sampling unit 3K is also electrically connected to the reset voltage point 61. The on/off-switch of the fifth reset switch 641 is controlled by the first reset signal 60, while the on/off-switch of the sixth reset switch 651 is also controlled by the second reset signal 62.

Figure 7:
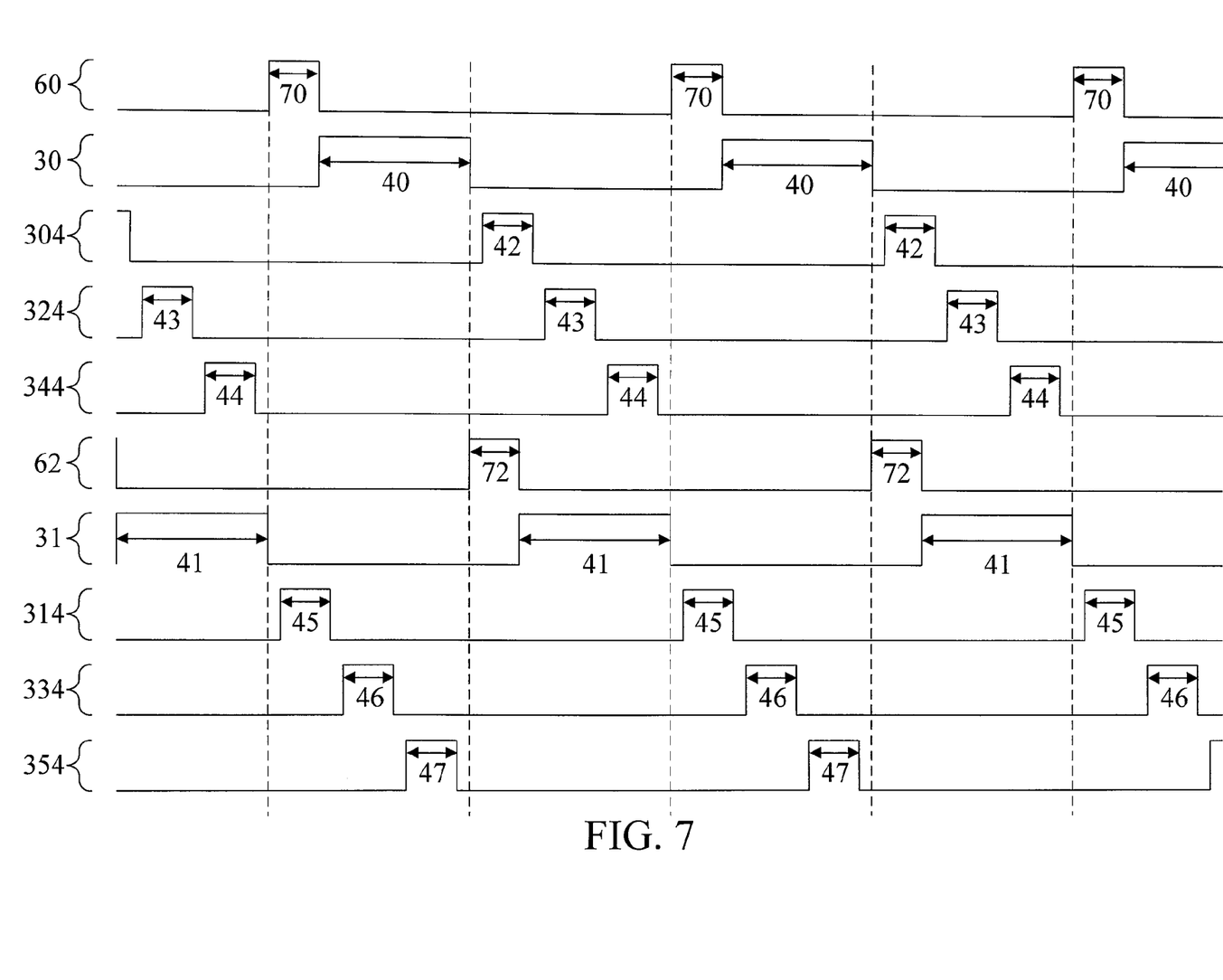
FIG. 7 is another waveform timing diagram of the preferred embodiment of the invention.

FIG. 7 depicts a waveform timing diagram of the first sampling signal 30, the second sampling signal 31, the first read-out signal 304, the second read-out signal 314, the third read-out signal 324, the fourth read-out signal 334, the fifth read-out signal 344, the sixth read-out signal 354, the first reset signal 60 and the second reset signal 62. The operations and functions of the first reset signal 60 and the second reset signal 62 will be described as follows.

Before the first sampling signal 30 turns on the first on-off switch 305 of the first sampling unit 3A, the third on-off switch 325 of the third sampling unit 3E and the fifth on-off switch 345 of the fifth sampling unit 3I (i.e., prior to the waveform internal 40) simultaneously, the first reset signal 60 turns on the first reset switch 601 of the first sampling unit 3A, the third reset switch 621 of the third sampling unit 3E and the fifth reset switch 641 of the fifth sampling unit 3I (i.e., during the waveform interval 70).

According to the first reset signal 60, the first reset switch 601 adjusts the voltage level of the first capacitor 307 to a voltage level supplied at the reset voltage point 61, while the third reset switch 621 adjusts the voltage level of the third capacitor 327 to the voltage level supplied at the reset voltage point 61. The fifth reset switch 641 adjusts the voltage level of the fifth capacitor 347 to the voltage level supplied at the reset voltage point 61.

Before the second sampling signal 31 turns on the second on-off switch 315 of the second sampling unit 3C, the fourth on-off switch 335 of the fourth sampling unit 3G and the sixth on-off switch 355 of the sixth sampling unit 3K (i.e., prior to the waveform internal 41) simultaneously, the second reset signal 62 turns on the second reset switch 611 of the second sampling unit 3C, the fourth reset switch 631 of the fourth sampling unit 3G and the sixth reset switch 651 of the sixth sampling unit 3K (i.e., during the waveform interval 72).

According to the second reset signal 62, the second reset switch 611 adjusts the voltage level of the second capacitor 317 to the voltage level supplied at the reset voltage point 61, the fourth reset switch 631 adjusts the voltage level of the fourth capacitor 337 to the voltage level supplied at the reset voltage point 61, and the sixth reset switch 651 adjusts the voltage level of the sixth capacitor 357 to the voltage level supplied at the reset voltage point 61.

By using the first reset signal 60 to adjust the voltage levels of the first capacitor 307, the third capacitor 327 and the fifth capacitor 347, the first data 302, the third data 322 and the fifth data 342 generated by the first sampling unit 3A, the third sampling unit 3E and the fifth sampling unit 3I in response to the sensing signals 221, 222, 223 respectively makes more accurate. Consequently, the distortion in reading the sensing signals 221, 222, 223 after an extended time period of use of the first capacitor 307, the third capacitor 327 and the fifth capacitor 347 is avoided. Likewise, by using the second reset signal 62 to adjust the voltage levels of the second capacitor 317, the fourth capacitor 337 and the sixth capacitor 357, the second data 312, the fourth data 332 and the sixth data 352 generated by the second sampling unit 3C, the fourth sampling unit 3G and the sixth sampling unit 3K in response to the sensing signals 221, 222, 223 respectively makes more accurate. Consequently, the distortion in reading the sensing signals 221, 222, 223 after an extended time period of use of the second capacitor 317, the fourth capacitor 337 and the sixth capacitor 357 is avoided. Accordingly, the user's input will not be misjudged.

Other elements of the data read-out controllers 251, 252, 253 shown in FIGS. 6A, 6B and 6C can also execute the operations and functions described with respect to the data read-out controllers 251, 252, 253 shown in FIG. 3. The method of the data read-out controllers 251, 252, 253 shown in FIGS. 6A, 6B and 6C execute these operations and functions will be readily appreciated by those of ordinary skill in the art based on the description of the data read-out controllers 251, 252, 253 shown in FIG. 3, and thus will not be further described herein.

Similarly, like the data read-out controllers 251, 252, 253 shown in FIG. 5, the data read-out controllers 251, 252, 253 shown in FIGS. 6A, 6B and 6C may have a first, second, third, fourth, fifth and sixth unity gain buffer added therein respectively. By maintaining the corresponding voltages, the first data 302, the second data 312, the third data 322, the fourth data 332, the fifth data 342 and the sixth data 352 outputted to the touch control chip 27 become more stable. The relevant operations and functions of these unity gain buffers will be readily appreciated by those of ordinary skill in the art based on the previous description, and thus will not be described herein again.

In summary, the display apparatus and the data read-out controller thereof according to the invention is capable of outputting a plurality of sensing signals from the touch display module via a single point, thus reducing the number of points of output sensing signals significantly and reducing the circuit complexity. As a result, the cost and power consumption of the touch display apparatus are reduced, and the performance of sensing a user's input is improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data read-out controller for use in a display apparatus, comprising:
   a first read-out switch;
   a second read-out switch;
   a first sampling unit having a first point and a second point, wherein the first point is configured to receive a sensing signal, and to generate a first data in response to the sensing signal; and
   a second sampling unit having a third point and a fourth point, wherein the third point is configured to receive the sensing signal, and to generate a second data in response to the sensing signal;
   wherein when the second sampling unit generates the second data in response to the sensing signal, the first read-out switch receives the first data from the second point in response to a first read-out signal and outputs the first data;
   wherein when the first sampling unit generates the first data in response to the sensing signal, the second read-out switch receives the second data from the fourth point in response to a second read-out signal and outputs the second data.

2. The data read-out controller as claimed in claim 1, wherein the first read-out switch is electrically connected to the second point of the first sampling unit, and the second read-out switch is electrically connected to the fourth point of the second sampling unit.

3. The data read-out controller as claimed in claim 1, further comprising:
   a first unity gain buffer being electrically connected to the second point of the first sampling unit and the first read-out switch, wherein the first data is outputted via the first unity gain buffer and the first read-out switch; and
   a second unity gain buffer being electrically connected to the fourth point of the second sampling unit and the second read-out switch, wherein the second data is outputted via the second unity gain buffer and the second read-out switch.

4. The data read-out controller as claimed in claim 1, wherein the first sampling unit further comprises:
   a first on-off switch being electrically connected to the first point and the second point of the first sampling unit; and
   a first capacitor having a first terminal and a second terminal, wherein the first terminal of the first capacitor is electrically connected to the second point of the first sampling unit;
   wherein when the first on-off switch receives the sensing signal in response to a first sampling signal, the first capacitor generates the first data in response to the sensing signal.

5. The data read-out controller as claimed in claim 4, further comprising a reset voltage point being configured to provide a reset voltage, wherein the first sampling unit further comprises:
 a first reset switch being electrically connected to the first terminal and the second terminal of the first capacitor and the reset voltage point;
 wherein when the second read-out switch outputs the second data in response to the second read-out signal, the first reset switch is configured to adjust a voltage level of the first capacitor to the reset voltage in response to a first reset signal.

6. The data read-out controller as claimed in claim 1, wherein the second sampling unit further comprises:
 a second on-off switch being electrically connected to the third point and the fourth point of the second sampling unit; and
 a second capacitor having a first terminal and a second terminal, wherein the first terminal of the second capacitor is electrically connected to the fourth point of the second sampling unit;
 wherein when the second on-off switch receives the sensing signal in response to a second sampling signal, the second capacitor generates the second data in response to the sensing signal.

7. The data read-out controller as claimed in claim 6, further comprising a reset voltage point being configured to provide a reset voltage, wherein the second sampling unit further comprises:
 a second reset switch being electrically connected to the first terminal and the second terminal of the second capacitor and the reset voltage point;
 wherein when the first read-out switch outputs the first data in response to the first read-out signal, the second reset switch is configured to adjust a voltage level of the second capacitor to the reset voltage in response to a second reset signal.

8. A display apparatus, comprising:
 a touch display module being configured to output a plurality of sensing signals, wherein the sensing signals comprise a first sensing signal and a second sensing signal;
 a first data read-out controller, electrically connected to the touch display module, being configured to receive the first sensing signal, and to generate a first data and a second data in response to the first sensing signal; and
 a second data read-out controller, electrically connected to the touch display module, being configured to receive the second sensing signal, and to generate a third data and a fourth data in response to the second sensing signal;
 wherein when the first data read-out controller and the second data read-out controller respectively generate the second data and the fourth data in response to the first sensing signal and the second sensing signal, the first data read-out controller outputs the first data in response to a first read-out signal, and the second data read-out controller outputs the third data in response to a third read-out signal;
 wherein when the first data read-out controller and the second data read-out controller respectively generate the first data and the third data in response to the first sensing signal and the second sensing signal, the first data read-out controller outputs the second data in response to a second read-out signal, and the second data read-out controller outputs the fourth data in response to a fourth read-out signal.

9. The display apparatus as claimed in claim 8, wherein the first data read-out controller further comprises:
 a first read-out switch;
 a second read-out switch;
 a first sampling unit having a first point and a second point, wherein the first point is configured to receive the first sensing signal, and to generate the first data in response to the first sensing signal; and
 a second sampling unit having a third point and a fourth point, wherein the third point is configured to receive the first sensing signal, and to generate the second data in response to the first sensing signal;
 wherein when the second sampling unit generates the second data in response to the first sensing signal, the first read-out switch receives the first data from the second point in response to the first read-out signal and outputs the first data;
 wherein when the first sampling unit generates the first data in response to the first sensing signal, the second read-out switch receives the second data from the fourth point in response to the second read-out signal and outputs the second data.

10. The display apparatus as claimed in claim 9, wherein the first read-out switch is electrically connected to the second point of the first sampling unit, and the second read-out switch is electrically connected to the fourth point of the second sampling unit.

11. The display apparatus as claimed in claim 9, wherein the first data read-out controller further comprises:
 a first unity gain buffer being electrically connected to the second point of the first sampling unit and the first read-out switch, wherein the first data is outputted via the first unity gain buffer and the first read-out switch; and
 a second unity gain buffer being electrically connected to the fourth point of the second sampling unit and the second read-out switch, wherein the second data is outputted via the second unity gain buffer and the second read-out switch.

12. The display apparatus as claimed in claim 9, wherein the first sampling unit further comprises:
 a first on-off switch being electrically connected to the first point and the second point of the first sampling unit; and
 a first capacitor having a first terminal and a second terminal, wherein the first terminal of the first capacitor is electrically connected to the second point of the first sampling unit;
 wherein when the first on-off switch receives the first sensing signal in response to a first sampling signal, the first capacitor generates the first data in response to the first sensing signal.

13. The display apparatus as claimed in claim 12, further comprising a reset voltage point being configured to provide a reset voltage, wherein the first sampling unit further comprises:
 a first reset switch being electrically connected to the first terminal and the second terminal of the first capacitor and the reset voltage point;
 wherein when the second read-out switch outputs the second data in response to the second read-out signal, the first reset switch is configured to adjust a voltage level of the first capacitor to the reset voltage in response to a first reset signal.

14. The display apparatus as claimed in claim 9, wherein the second sampling unit further comprises:
 a second on-off switch being electrically connected to the third point and the fourth point of the second sampling unit; and a second capacitor having a first terminal and a second terminal, wherein the first terminal of the second capacitor is electrically connected to the fourth point of the second sampling unit;

wherein when the second on-off switch receives the first sensing signal in response to a second sampling signal, the second capacitor generates the second data in response to the first sensing signal.

15. The display apparatus as claimed in claim 14, further comprising a reset voltage point being configured to provide a reset voltage, wherein the second sampling unit further comprises:

a second reset switch being electrically connected to the first terminal and the second terminal of the second capacitor and the reset voltage point;

wherein when the first read-out switch outputs the first data in response to the first read-out signal, the second reset switch is configured to adjust a voltage level of the second capacitor to the reset voltage in response to a second reset signal.

16. The display apparatus as claimed in claim 8, wherein the second data read-out controller further comprises:

a third read-out switch;

a fourth read-out switch;

a third sampling unit having a fifth point and a sixth point, wherein the fifth point is configured to receive the second sensing signal, and to generate the third data in response to the second sensing signal; and a fourth sampling unit having a seventh point and an eighth point, wherein the seventh point is configured to receive the second sensing signal, and to generate the fourth data in response to the second sensing signal;

wherein when the fourth sampling unit generates the fourth data in response to the second sensing signal, the third read-out switch receives the third data from the sixth point in response to the third read-out signal and outputs the third data;

wherein when the third sampling unit generates the third data in response to the second sensing signal, the fourth read-out switch receives the fourth data from the eighth point in response to the fourth read-out signal and outputs the fourth data.

17. The display apparatus as claimed in claim 16, wherein the third read-out switch is electrically connected to the sixth point of the third sampling unit, and the fourth read-out switch is electrically connected to the eighth point of the fourth sampling unit.

18. The display apparatus as claimed in claim 16, wherein the second data read-out controller further comprises:

a third unity gain buffer being electrically connected to the sixth point of the third sampling unit and the third read-out switch, wherein the third data is outputted via the third unity gain buffer and the third read-out switch; and a fourth unity gain buffer being electrically connected to the eighth point of the fourth sampling unit and the fourth read-out switch, wherein the fourth data is outputted via the fourth unity gain buffer and the fourth read-out switch.

19. The display apparatus as claimed in claim 16, wherein the third sampling unit further comprises:

a third on-off switch being electrically connected to the fifth point and the sixth point of the third sampling unit; and a third capacitor having a first terminal and a second terminal, wherein the first terminal of the third capacitor is electrically connected to the fifth point of the third sampling unit;

wherein when the third on-off switch receives the second sensing signal in response to a third sampling signal, the third capacitor generates the third data in response to the second sensing signal.

20. The display apparatus as claimed in claim 19, further comprising a reset voltage point being configured to provide a reset voltage, wherein the third sampling unit further comprises:

a third reset switch being electrically connected to the first terminal and the second terminal of the third capacitor and the reset voltage point;

wherein when the fourth read-out switch outputs the fourth data in response to the fourth read-out signal, the third reset switch is configured to adjust a voltage level of the third capacitor to the reset voltage in response to a third reset signal.

21. The display apparatus as claimed in claim 16, wherein the fourth sampling unit further comprises:

a fourth on-off switch being electrically connected to the seventh point and the eighth point of the fourth sampling unit; and a fourth capacitor having a first terminal and a second terminal, wherein the first terminal of the fourth capacitor is electrically connected to the eighth point of the fourth sampling unit;

wherein when the fourth on-off switch receives the second sensing signal in response to a fourth sampling signal, the fourth capacitor generates the fourth data in response to the second sensing signal.

22. The display apparatus as claimed in claim 21, further comprising a reset voltage point being configured to provide a reset voltage, wherein the fourth sampling unit further comprises:

a fourth reset switch being electrically connected to the first terminal and the second terminal of the fourth capacitor and the reset voltage point;

wherein when the third read-out switch outputs the third data in response to the third read-out signal, the fourth reset switch is configured to adjust a voltage level of the fourth capacitor to the reset voltage in response to a fourth reset signal.

* * * * *